United States Patent [19]

Erickson

[11] 3,714,501

[45] Jan. 30, 1973

[54] LINEARITY CORRECTION FOR MAGNETICALLY DEFLECTABLE CATHODE RAY TUBES

[75] Inventor: Fred W. Erickson, Northridge, Calif.

[73] Assignee: Litton Systems, Inc., Beverly Hills, Calif.

[22] Filed: Nov. 26, 1971

[21] Appl. No.: 202,445

[52] U.S. Cl. ................................315/24, 315/27 GD

[51] Int. Cl. ................................................H01j 29/76

[58] Field of Search ............................315/24, 27 GD

[56] References Cited

UNITED STATES PATENTS 3,422,306 1/1969 Gray ...............................315/27 GD 3,517,252 6/1970 Williams, Jr. ............................315/24

*Primary Examiner*—Carl D. Quarforth

*Assistant Examiner*—E. E. Lehmann

*Attorney*—Alan C. Rose et al.

[57] ABSTRACT

Apparatus is provided for correcting output signals to the yoke of a CRT. The output signals are corrected in a feedback loop and recombined with the input signals in accordance with the algorithms $X_o = g\ [X_{in} - CX_o(X_o^2 Y_o^2)]$ and $Y_o = g\ [Y_{in} - CY_o(X_o^2 Y_o^2)]$ where $X_o$ and $Y_o$ are the output signals for the X and Y yokes of the CRT, $X_{in}$ and $Y_{in}$ are the uncorrected input deflection signals, and g and C are gain constants associated with the apparatus.

4 Claims, 1 Drawing Figure

PATENTED JAN 30 1973 3,714,501
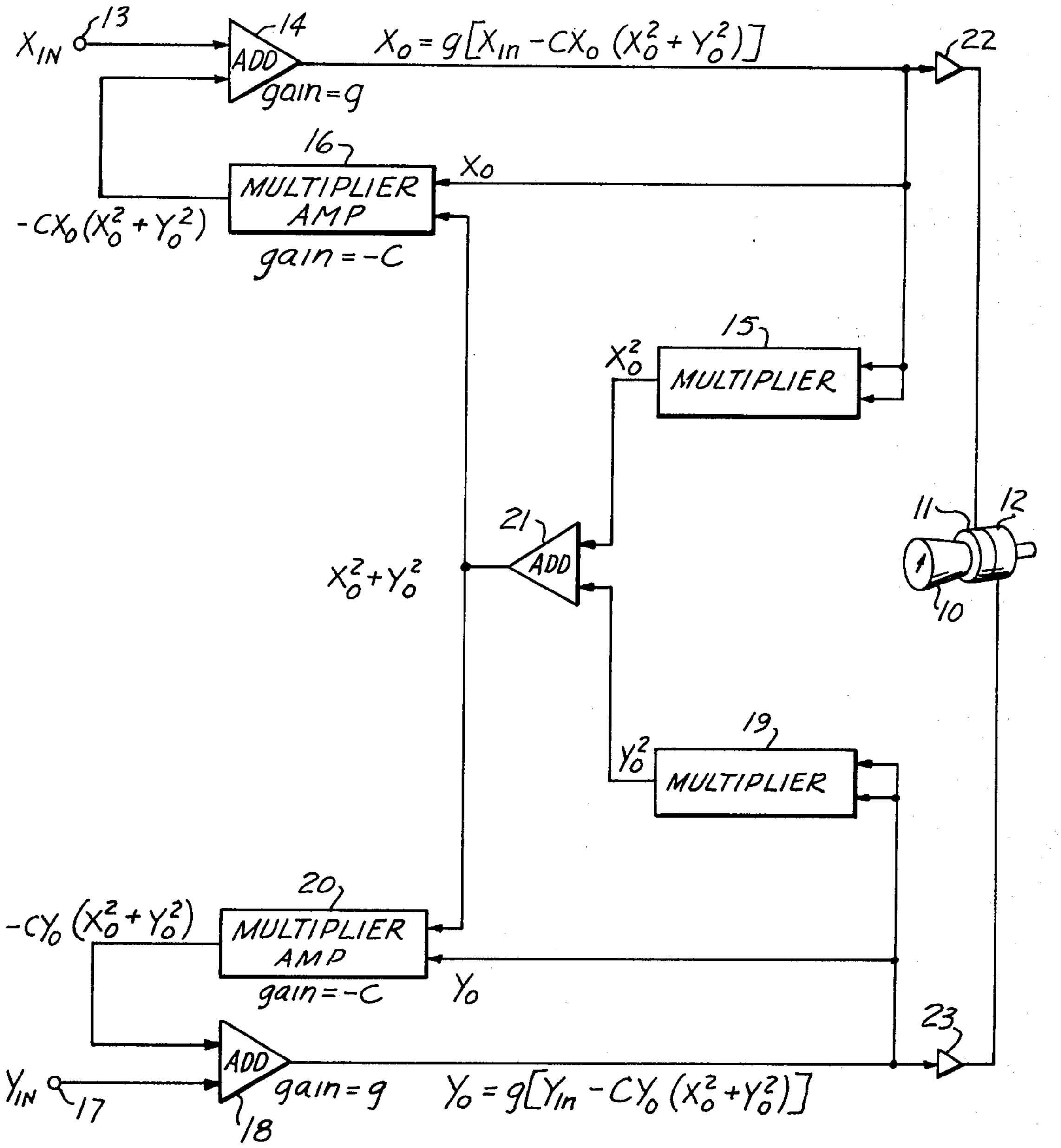
INVENTOR.
FRED W. ERICKSON
BY Robert M. Angus
ATTORNEY.

LINEARITY CORRECTION FOR MAGNETICALLY DEFLECTABLE CATHODE RAY TUBES

This invention relates to linearity correction for magnetically deflectable cathode ray tubes, and particularly to linearity correction techniques utilizing correction of output deflection voltages.

The linearity of a magnetically deflectable cathode ray tube (CRT) is dependent upon the geometry of the cathode ray tube and its deflection yokes. Positional error, commonly known as "pin-cushion error" can be calculated from the geometry of the tube in the case of "perfect" tubes. In the practical case, however, the degree of correction required for providing linearity is dependent not only on the geometries of the tube, but also upon the degree of deflection.

Heretofore, linearity correction techniques for magnetically deflectable cathode ray tubes have operated on the input deflection voltages to correct such voltages for delivery to the yokes of the cathode ray tube. However, such correction techniques have not been accurate for all positions of the display. One example of an existing linearity correction technique is found in U.S. Pat. No. 3,517,252, granted June 23, 1970 to R. M. Williams, Jr. A careful analysis of the techniques disclosed in the Williams patent shows that the outputs to the X and Y yokes of a cathode ray tube are in accordance with the following functions:

$$X_0=\frac{X_{in}}{1+C(X_{in}^2+Y_{in}^2)}$$

and $$Y_0=\frac{Y_{in}}{1+C(X_{in}^2+Y_{in}^2)}$$

where $X_o$ and $Y_o$ are the output voltages to the X and Y yokes, $X_{in}$ and $Y_{in}$ are the X and Y input voltages, and C is a gain constant associated with the linearity correction circuits when the gain constant is small, $X_o = X_{in} - CX_{oin}(X^2_{in} + Y^2_{in})$ and $Y_o = Y_{in} - CY_{oin}(X^2_{in} + Y^2_{in})$.

The technique advanced in the Williams patent expands the values of the input voltages to correct the input voltages to derive a corrected output voltage. However, it has been found that more accurate linearity correction has been achieved by expanding the output voltages in a feedback loop operating on the output signals so that a high degree of linearity correction can be obtained even at the extremities of the CRT.

It is accordingly an object of the present invention to provide apparatus for linearity correction of magnetically deflectable cathode ray tubes which operates on the output voltages to the yokes to derive more accurate linearity corrections than heretofore achieved.

Another object of the present invention is to provide apparatus for series expanding the output voltages from a linearity correction circuit for more accurate linearity correction of signals to the yokes of a magnetically deflectable cathode ray tube.

In accordance with the present invention, linearity correction apparatus is provided having an output signal adapted to be connected to the yokes of a magnetically deflectable cathode ray tube. The X and Y output signals are forwarded through multipliers to derive the sum of the squares of the output signals, which, in turn, is multiplied by the output signals for each of the X and Y deflection circuits. The result is subtracted from the input signal, for delivery to the yokes.

One feature of the present invention resides in the provision of algorithms for more accurate linearity correction of deflections for magnetically deflected cathode ray tubes.

The above and other features of this invention are more fully understood from the following detailed description, and the accompanying drawing in which the single figure is a circuit diagram illustrating the linearity correction apparatus in accordance with the presently preferred embodiment of the present invention.

In accordance with the present invention, a cathode ray tube 10 is provided with X and Y yokes 11 and 12. Terminal 13 is connected to one input of adder 14 which, in turn, is connected to both inputs of multiplier 15 and to one input of multiplier-amplifier 16. Likewise, terminal 17 is connected to one input of adder 18 which, in turn, is connected to both inputs of multiplier 19 and to one input to multiplier-amplifier 20. The output from multiplier 15 and the output from multiplier 19 are connected to separate inputs of adder 21 which, in turn, is connected to a second input of each of multipliers 16 and 20. The output from amplifier 16 is connected to a second input of adder 14 and the output from multiplier 20 is connected to a second input of adder 18. Yoke amplifier 22 has its input connected to the output of adder 14 and its output connected to yoke 11, and yoke amplifier 23 has its input connected to the output of adder 18 and its output connected to yoke 12.

In operation of the apparatus, an X input signal, $X_{in}$, ordinarily in the form of a deflection voltage, is applied to terminal 13. The output signal, $X_o$, from adder 14 is supplied to both inputs of multiplier 15 to derive a signal representative of $X_o^2$. Likewise, a deflection voltage input signal, $Y_{in}$, is supplied to adder 18 via terminal 17 to derive an output voltage of $Y_o$ which is supplied to both inputs of multiplier 19 to derive a signal representative of $Y_o^2$. Adder 21 adds the $X_o{}_o^2$ and $Y_o^2$ signals to derive a signal representative of $X_o^2+Y_o^2$. The result is supplied to multipliers 16 and 20. Multiplier 16 multiplies the $X_o^2+Y_o^2$ and $X_o$ signals to derive a signal representative of $-CX_o(X_o^2+Y_o^2)$ and where $-C$ is the gain of multiplier 16. The result is added to the $X_{in}$ signal by adder 14 whose gain is g. Likewise, multiplier 20 multiplies the $X_o^2+Y_o^2$ and $Y_o$ signal to derive a signal representative of $-CY_o(X_o^2+Y_o^2)$ where $-C$ is the gain of multiplier 20, and the result is added by adder 18 to $X_{in}$ and multiplied by the gain g of adder 18. As a result, corrected output voltages are supplied to amplifiers 22 and 23 in accordance with the algorithms:

$$X_o=g[X_{in}-CX_o(X_o^2+Y_o^2)]$$
$$Y_o=g[Y_{in}-CY_o(X_o^2+Y_o^2)]$$

The value of g and C are dependent upon the radius of curvature of the cathode ray tube and the radius of deflection. It can be shown that the values of C and g may be calculated from:

$$C = (1/2d^2)$$

$$g = k/d$$

where $d$ = Imax/(tan $\theta$ max), $k$ = Zmax/(sin $\theta$ max), Zmax is the maximum deflection of the CRT, Imax is the deflection current necessary to achieve maximum deflection, and $\theta$ max is the maximum deflection angle. It can be shown that for a flat face CRT having a 25° radius, the values of $g = 1.108$ and $C = 0.1310$ produce a maximum error of less than 0.1 percent.

One feature of the present invention resides in the fact that several input signals may be utilized to control deflection. For example, several $X_{in}$ sources may be connected to the input of adder 13 which will combine them to derive an $X_o$ output signal which, in turn, is corrected in the feedback loop for recombination with the input signals. In a similar manner, several $Y_{in}$ sources may be utilized for Y-axis deflection.

The present invention thus provides apparatus for linearity correction of signals supplied to magnetically deflectable cathode ray tubes which is more accurate than prior deflection correction apparatus. By utilizing feedback signals for corrective output deflection signals, several input signals may be utilized for deflection correction without correcting each individual input signal.

This invention is not to be limited by the embodiment shown in the drawing or described in the description, which is given by way of example and not of limitation, but only in accordance with the appended claims.

What is claimed is:

1. Linearity correction apparatus for magnetically deflectable cathode ray tubes comprising: first and second input means adapted to receive first and second uncorrected input signals representative of $X_{in}$ and $Y_{in}$, respectively; first output means adapted to supply a first output signal $X_o$ to an X-axis yoke of said cathode ray tube; and second output means adapted to supply a second output signal $Y_o$ to a Y-axis yoke of said cathode ray tube; said first output signal being derived in accordance with the algorithm $X_o = g[X_{in} - CX_o (X_o^2 + Y_o^2)]$ and said second output signal being derived in accordance with the algorithm $Y_o = g]Y_{in} - CY_o(X_o^2 + Y_o^2)]g$ and $C$ are constants.

2. Apparatus according to claim 1 further including means for deriving a signal representative of $(X_o^2+Y_o^2)$, first multiplier means having a gain of $-C$ for multiplying said signal representative of $(X_o^2+Y_o^2)$ times said first output signal to derive a signal representative of $-CX_o(X_o^2+Y_o^2)$, first adder means having a gain of g for adding said first input signal to said signal representative of $-CX_o(X_o^2+Y_o^2)$, and means connecting said first output means to the output of said first adder means; second multiplier means having a gain of $-C$ for multiplying said signal representative of $(X_o^2+Y_o^2)$ times said second output signal to derive a signal representative of $-CY_o(X_o^2+Y_o^2)$, second adder means having a gain of g for adding said second input signal to said signal representative of $-CY_o(X_o^2+Y_o^2)$, and means connecting said second output means to the output of said second adder means.

3. Linearity correction apparatus for a magnetically deflectable cathode ray tube comprising: first adder means having first and second inputs and an output; means for connecting said first input of said first adder means to a source of uncorrected deflection signals for X-axis deflection of said cathode ray tube; means connecting said output of said first adder means to an X-axis yoke of said cathode ray tube; first squaring means having an input and an output; means connecting said input of said first squaring means to said output of said adder means; second adder means having first and second inputs and an output; means connecting said first input of said second adder means to said output of first squaring means; first multiplier means having a gain of $-C$ and having first and second inputs and an output; means connecting said first input of said first multiplier means to said output of said second adder means; means connecting said second input of said first multiplier means to said output of said first adder means; means connecting said output of said first multiplier means to said second input of said first adder means; third adder means having first and second inputs and an output; means for connecting said first input of said third adder means to a source of uncorrected deflection signals for Y-axis deflection of said cathode ray tube; means connecting said output of said third adder means to a Y-axis yoke of said cathode ray tube; second squaring means having an input and an output; means connecting said input of said second squaring means to said output of said third adder means; means connecting said output of said second squaring means to said second input of said second adder means; second multiplier means having a gain of $-C$ and having first and second inputs and an output; means connecting said first input of said second multiplier means to said output of said second adder means; means connecting said second input of said second multiplier means to said output of said third adder means; and means connecting said output of said second multiplier means to said second input of said third adder means.

4. Apparatus in accordance with claim 3 wherein each of said first and third adder means have a gain of $g$.

* * * * *